(12) United States Patent  
Miwa et al.

(10) Patent No.: US 6,230,268 B1
(45) Date of Patent: May 8, 2001

(54) DATA CONTROL SYSTEM

(75) Inventors: Kunihiko Miwa, Hiratsuka; Norishige Morimoto, Tokyo-to; Shuichi Shimizu, Yokohama, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/127,061

(22) Filed: Jul. 31, 1998

(30) Foreign Application Priority Data

Sep. 12, 1997 (JP) .................................................. 9-248272

(51) Int. Cl.[7] ....................................................... G06F 11/30

(52) U.S. Cl. ........................... 713/176; 713/164; 713/165; 713/182

(58) Field of Search ................................... 713/165, 164, 713/176, 179, 180, 182, 189, 200, 201

(56) References Cited

PUBLICATIONS

"IBM DataHiding™ Proposal—Version 1.0," *IBM Corporation*, Issued by the Data Hiding Subgroup, pp. 1–29, Sep. 2, 1997.

*Primary Examiner*—Thomas R. Peeso
(74) *Attorney, Agent, or Firm*—Scully, Scott, Murphy & Presser; Louis P. Herzberg

(57) ABSTRACT

An object of the Invention is to provide a system and method for effecting a secure data control using an electronic watermarking with a low manufacturing cost. A solution of the objective is a data control system is built which comprises; embedding a control flag indicating to control data using an electronic watermarking technique, preparing a token having information as to how to control the data by using the content of the data, distributing the token appended to the data, detecting the control flag from the distributed data, reading the token appended to the data when the control flag is detected, and controlling the data according to a predefined control rule of the token or the control flag. In addition, a subsequent data control is further suppressed by modifying the token in controlling the data.

42 Claims, 7 Drawing Sheets

DATA CONTROL SYSTEM

TECHNOLOGY AREA OF THE INVENTION

This invention relates to a data control system using an electronic watermarking technique (data-hiding). More particularly, this invention relates to a technique of allowing data to be handled by a desired data control (copying control, play-back control and receiving control, etc., for example) in a place where the data is delivered using a token which has a control flag indicating to effect a data control and information of a manner of controlling the data.

PRIOR ART

As a multimedia environment is widely spread out, a problem is the protection of a copyrighted material. Despite a digital video disk (DVD), a set top box (STB), a cable television system and a network distribution, etc., have a sufficient specification in hardware aspect for distribution of theater movies, no specification sufficiently satisfying suppliers of the contents has been provided as to the protection of the contents, particularly, the problem of illegal reproduction (copy). This is because an effective specification has not been provided to prevent such problem despite it is very easy to copy and modify data contents of digital data. This invention provides a mechanism of safely distributing many attractive contents which use such media with a method for embedding a control mechanism in the content itself so as to allow the content to be distributed with a condition to permit copying only once (one time copy).

Some methods of data control have so far existed to protect contents and prohibit the contents from being copied and played back. PUPA6-4026, for example, discloses a technique of generating a code 2 which is converted from a suitably generated code 1 by a one-way conversion f as a code indicating permission information of each category and the code 1 and the code 2 are both described when a permission is indicated while only the code 2 is described when prohibition is indicated to make generation of permission state difficult. However, this method allows multiple copying by saving the code 1 and thereafter describing it together with the code 2.

For example, PUPA 6-309239 discloses a method of permitting one time only copying in which, using a flag file indicating that a data file has not been copied, an encrypted data file is converted to an original data file if the flag file exists and then the flag file is erased after the data file is copied. However, because the flag file is a file separate from the data file, multiple copying is easily done simply by saving the flag file and reproducing it in this method. In addition, because it is determined that play-back is prohibited if the flag does not match or exist, even a content which is photographed or produced by an author falls in the category of prohibition.

The prior art methods basically use a code or a flag which is separate from the data in applying a data control. Once such separate code or flag is identified in such methods, manipulation of such code or flag is possible so that these methods have a weak point against a willful attack by a third party. A technique usable for data control which is free from such disadvantages is desired. Further, it is desired to obtain a novel data control method which is totally independent of conventional data control methods and is upper or downward compatible without affecting existing video distributing system or the mechanism of devices.

The electronic watermarking technique exists for the copyright protection of a still image, motion picture and a voice. The electronic watermarking technique is a technique which is also called data hiding (TM). Simply stating, this is a collective name of a technique for embedding certain information in other media (still image, voice and motion picture, etc.) and aims at the way of integrating the information in a medium in which the information is embedded rather than the way of hiding information as used in encryption. In other words, a method is employed for embedding information which is desired to be hidden in the data of a medium by manipulating the data of the medium. This means, in image data for example, information other than the essential data is carried by modifying a pixel value such as the brightness. Incidentally, the term "embed" as used in this invention means that extra information is hidden in the form of modification of the data itself.

One of major characteristics of the electronic watermarking is that it is an invisible or inaudible marking technique. In embedding information in media, the existing data is so modified (data modification) that the data is not detected by a human eyesight rather than appending data bits so that total data size is not increased by embedding the appended information. For example, embedding data in an image consisting of 640×480 pixels does not increase the number of pixels. Also, by embedding text information or voice information in an image, it is enough for the storage side to handle a single kind of medium. One of the most remarkable characteristics is the inseparability of embedded information. Because the electronic watermarking embeds the appended information directly in the data structure of the medium rather than a header or a file, the embedded information can be detected even if the platform or the data format changes so long as the quality of the original data is preserved.

An example of a data control method using the electronic watermarking technique is given below. Not only in recording, copy and play-back in a place where data is delivered, but also in the broadcasting of data by a radio wave, whether to permit receiving of data or not (receiving control) can be controlled entirely in a similar manner.

(1) a step of embedding a control flag (CF) indicating a protection level of the contents in video data using a electronic watermarking technique, (2) a step of detecting the CF embedded in said contents to determine whether or not recording or play-back of the video is permitted for suitably controlling recording or play-back (video recording is stopped when a CF indicating prohibition of recording is detected in recording while it is determined that the video is an illegal copy and play-back is stopped when a medium played back is for recording and a CF indicating prohibition of recording is detected in play-back.), and (3) a step of permitting recording and leaving a record indicating that the video has been recorded when a CF indicating permission of one time only recording is detected, and prohibiting another recording by the CF and the recorded mark when the recorded contents are played back and another recording is attempted.

The steps (1) and (2) can be implemented by embedding a CF in the contents in advance by the electronic watermarking technique in preparing the contents. The step (3) can be also implemented to prohibit another recording using the electronic watermarking in the manner similar to the steps (1) and (2). However, a problem exists in this case. A video recording apparatus is mostly possessed by an end user in general and it has to be made compactly and in a low price. It is practically difficult to implement the electronic watermarking embedding for appending a mark of recording done by taking image quality and residual signal intensity into consideration in preparing contents in such apparatus of a limited processing capability.

When the subject video data is image data which is MPEG compressed, for example, it is necessary to restore the image data which has embedded therein a mark of recording done by re-composing it with the rest of data (voice data and sub-picture, etc.) in addition to separation of video data for detecting the CF. The sum of buffers and circuits required therefor would amount to more than twice as large as the CF detection circuit and this does not give a practical solution. Further, because video data which subjects to embedding consists of I-frame, a disadvantage exists in which the embedded information does not remain in other frames (B and P) when the data is decompressed.

SUMMARY OF THE INVENTION

Accordingly, it is an object of this invention to provide a system and a method of low cost and secure data control using a electronic watermarking technique.

It is another object of this invention to provide a system of safely controlling copying, play-back and receiving of data using a electronic watermarking technique.

It is still another object of this invention to provide a method and a system which are resistive to an attack by a willful third party.

It is a further object of this invention to provide a method and a system of data control which are less expensive in the cost and still have an equal or more functions in comparison to the prior art technology.

It is a still further object of this invention to provide a novel method and system of data control which are totally independent of the prior art method of data control but are still capable of co-existing with existing methods.

DETAILED DESCRIPTION OF THE INVENTION

In order to solve the above described objectives, a data control (including control of copying, play-back and receiving) system is built which comprises; embedding a control flag indicating to control data using an electronic watermarking technique, preparing a token having information as to how to control the data (number of copies and play-backs, designation of reproducing equipment and user, etc., for example) by using the content of said data, distributing said token appended to said data, detecting said control flag from the distributed data, reading said token appended to said data when said control flag is detected, and controlling said data according to a predefined control rule (a rule deciding the type of control by a combination including the token, flags and type of media) of said token or said control flag.

In addition, a subsequent data control is further suppressed by modifying the token (deletion of the token, change of the number of the tokens, modification of token preparing image part) in controlling the data.

MODE OF PRACTICING THE INVENTION

Preparation of a token and the data control are now explained separately. The flow of preparation process of a token is shown in FIG. 7. In step 700, a CF is embedded in the original data using an electronic watermarking technique. The data as used here includes an image, a voice, a still image and a motion picture. Next, in step 710, a portion from which the token is to be prepared is extracted from the data in which the CF is embedded using an embedded key. A token is prepared from the extracted data using a one-way function in step 720. The token may be prepared from an abstract by a method using an asymmetrical key instead of the one-way key. Otherwise, a plurality of tokens may be prepared using different keys. In step 730, the prepared token is appended to the data in which the CF is embedded using a user data area.

The flow of data control process is next shown in FIG. 8. In step 800, it is determined whether or not there is a CF embedded using the electronic watermarking technique in the distributed data. If a CF is not detected in the step 800, a control which is in no way restricted, such as copying, recording and play-back, etc., is done. If a CF is detected in the step 800, it is determined in the step 820 whether or not there is a token which is appended (a validation of the token may be included at this time). If the result of the step 820 is NO, data control is inhibited. That is, copying, recording or play-back is not done and the process ends. If the result of the step 820 is YES, a data control (copying, recording or play-back, etc.) is done according to a predefined control rule of the token or the above control flag. The predefined control rule as used here is a rule which defines the content of the control according to the token and the flag as well as the kind of data recording/reproducing media, etc. The content of the control is typically decided by a combination of parameters arrayed in a table. Methods of such combination are not described in detail because they are known. Those skilled in the art can easily modify the rule to a more detailed form so as to implement a variety of controls. If necessary, the token is manipulated in the step 840 to modify the subsequent data control. Manipulation of the token means a change of the number of the tokens to limit the number of copyings, and deletion, disabling and modification of the token. In addition, the portion of the data from which the token is to be prepared may be manipulated. The token may be manipulated before the data control is done by the token for the purpose of security.

The roles of the control flag and the token are same except that a predetermined data control is done only when the control flag exists. Information to control the data (the number of permitted copies, etc.) may be included in either the control flag or the token, or in both.

EMBODIMENT OF THE INVENTION

An embodiment of this invention is now described with reference to the drawings. FIG. 1 shows an embodiment of a hardware configuration of a data control (including control of copying, play-back and receiving, and preparation of a token) system used in this invention. The system 100 comprises a central processing unit (CPU) 1 and a memory 4. The CPU 1 and the memory 4 are connected to a hard disk device 13 (or a recording medium drive device such as an MO, a CD-ROM 23 and a DVD 32) as an auxiliary storage via an IDE controller 25. Similarly, the CPU 1 and the memory 4 are connected to a hard disk device 30 (or a recording medium drive device such as an MO 28, a CD-ROM 23 and a DVD 31) as an auxiliary storage via an SCSI controller 25. A floppy disk device 20 is connected to the bus 2 through a floppy disk controller 19.

A floppy disk is inserted to the floppy disk device 20. A computer program code which gives instructions to the CPU and the like in cooperation with an operating system to practice this invention is recorded in the floppy disk, the hard disk device 13 (or a recording medium such as an MO, a CD-ROM and a DVD), 30 and a ROM 14 and executed by being loaded in the memory 4. The computer program code may be compressed or divided into pieces for recording in a plurality of media.

Further, the 100 may be provided with a user interface hardware including a pointing device 7 (a mouse and a joystick, etc.) for inputting, a keyboard 6 and a display 12 for presenting visual data to the user. Further, a printer may be connected via a parallel port 16 and a modem may be connected via a serial port 15. The system 100 can be connected to a network via the serial port and the modem or a communication adapter 18 (Ethernet an token ring cards) for communication with other computers and the like. In this invention, the distributed data can be sent and received by the serial port 16 and the modem or the communication adapter 18 in addition to distribution by a medium such as a floppy disk. Further, a remote transmitter/receiver may be connected to the serial port 15 or the parallel port 16 for transmitting/receiving by means of infrared or radio wave radiation.

A speaker 23 receives an audio signal from an audio controller 21 via an amplifier 22 for output as a voice. The audio controller 21 A/D (analog/digital) converts voice information received from a microphone 24 to allow voice information external to the system to be detected in the system.

As such, it will be readily understood that the data control system of this invention may be practiced by a conventional personal computer (PC), a workstation, a notebook PC, a palm top PC, a network computer, home electric appliances such as a television set and a facsimile equipment implementing a computer, and communication terminals including a game machine having a communication function, a telephone set, a facsimile equipment, a portable telephone, a PHS, an electronic notebook, or a combination thereof. It should be noted, however, that these components are given for exemplary purpose and it is not meant that all of these components are the indispensable components of this invention.

An embodiment of a DVD-R system for preparing a token and controlling data is now described. FIG. 2 shows a case where the DVD 31 or the DVD 32 of the system 100 is externally connected while FIG. 3 shows a case where they are internally implemented. An externally attachable DVD-R drive 40 and an internally implemented DVD-R drive 50 are connected to the system 100 by an IDE (ATAPI: ATA Packet Interface) interface (they may be connected via SCSI). A block diagram of the DVD-R system is shown in FIG. 4.

In FIG. 4, a disk 210 is driven by a motor 214 which is connected to a drive circuit 212 and data recorded in the disk 210 is read by an opt-electrical head 216. The drive circuit 212 operates by a command from a DVD control block 218. The signal read by the opt-electrical head 216 is inputted to the DVD control block 218 where it is amplified, converted if necessary, and sent to a decoder block 220. The decoder block 220 modulates and demodulates the signal and corrects an error of the signal. The DVD control block 218 includes a servo circuit 218B receiving a control signal from the decoder block or servo data recorded in the disk to control the drive circuit 212. The DVD control block 218 also includes a signal reading circuit 218A.

The data received in the decoder block 220 is error corrected by a buffer 220A, an MPU 220B and a decoder 220C in the decoder block which are connected by a common bus, decoded in real time and sent to a data control block 230. In the data control block 230, generation of a token, appending the token to the object data, detection of CF information, data control by the token and manipulation of the token are done using an electronic watermarking technique. Image data is sent to the system 100 via an ATAPI interface 222 while voice data is sent to the system 100 via a DAC (digital to analog converter) 224.

In recording, the data flows conversely to reading from the ATAPI interface 222 through the data control block 230, and the decoder block 220 to the DVD control block. The opt-electrical head 216 operates as a recording head at this time. While the above DVD-R data control system cooperates with the data processing system 100, a stand alone DVD play-back machine or a stand alone DVD-R recording machine can also work without departing from the substance of this invention.

FIG. 5 shows an embodiment of a copy control system in digital image distribution using a one-way hash function. In summary, this is a system which prohibits a further copying or recording by appending a token to a broadcasted digital data for controlling copying or recording using an electronic watermarking technique and disabling the token once the data is copied or recorded. While the token may include information as to the manner of controlling data (the number of permitted copies, the number of permitted play-backs, designation of reproducing equipment and designation of a user, etc.) as the CF (control flag) does, it is assumed in FIG. 5 and FIG. 6 that whether data may be copied or not is determined depending on the presence or absence of a token for simplifying the description. Further, the number of tokens may be changed to a desired number depending on the environment of implementation (the number of the tokens may be defined as the limit of the number of copies or play-backs for example).

In the embodiment of FIG. 5, a CF indicating to allow copying up to one time is embedded in the content by an electronic watermarking technique. The recording machine is allowed to copy only one time only when this CF is detected. The result of arithmetic operation of a digital content is appended to the digital contents such as a digital image, a digital video and a digital audio (including a compressed stream such as MPEG). The result of the arithmetic operation is called a "token". It is determined whether copying or play-back is permitted or not depending on the presence or absence of the "token".

The copying control system is now described in more detail. In FIG. 5, the token is a bit string which is calculated from a part (or all) of image data using a one-way hash function, etc., and is recorded or held in a predetermined place as a comment field or user data and distributed along with the image data. The one-way hash function for generating a token is publicly known and includes MD5 or CRC (Cyclic Redundancy Check). The function to generate a token or the portion of the image to which arithmetic operation is applied is held in secret to prevent the token from being generated in the user side.

The image data to which a one-way hash function is applied is selected by an embedded key. The portion of the image data to be used and the initial value of the hash arithmetic operation are kept in secret while the hash function itself to be used is open to public. The generated token is appended by recording it in an append data area (the user data area in MPEG2, for example, 8×n bits can be used with 8 bits per unit). On the other hand, the one-way hash function is generally expressed by;

$$h=H(M)$$

where M is a message (numerical value) of an arbitrary length, h is a numerical value of a fixed length and H is a defined hash function. The one-way hash function is defined as satisfying the following conditions in addition to the above condition.

it is easy to calculate h when M is given.

it is difficult to calculate M (reverse conversion) when h is given.

it is difficult to find M' which satisfies H(M)=H(M') when M is given.

This characteristic is utilized to electronically sign the data, authenticate or detect whether or not modification is involved. The input message M may be a plurality of elements. An example of generating a hash by the following method is given here.

$$H_i=H(I^i,H^{i-1})(I^0=k)$$

Namely, $M^i$ is a combination of $I^1, I^2, \ldots I^n$ and the first to the i-th hash values. $I^i$ is an image data block and n blocks $I^1$ to $I^n$ are selected by an embedded key. $H_i$ is the hash value of the i-th image data block and a hash value is obtained by taking $I^i$ and up to (i−1)th hash values ($h^{i-1}$) as an input and repeating the arithmetic operations by a number of times equal to the number of the image data blocks (n) which is the subject of the arithmetic operations. $I^0$ is represented by a constant and is also held in secret along with the embedded key.

In generating a token, an effective token is appended only when a CF which is embedded by an electronic watermarking technique indicates that the content may be copied once. The token is also generated from a signal detected from a mark embedded by an electronic watermarking technique. In this case, a token or an abstract is generated using a signal from an electronic watermarking detector in authenticating the token in the user side.

The generated token is written in the user data (UD) area of extended data which exists in a sequence header of the MPEG format, for example. The generated token may be recorded by scrambling it with an asymmetrical key. In this case, the token can not be generated even if a clacker can know the portion of image information which is used for generating the token.

In the user side, the token is authenticated as being valid only when the CF embedded by an electronic watermarking indicates that the content may be copied once. A token is generated in a similar manner in a recording machine, etc., from a distributed image and is verified to see whether or not it matches the token which is distributed along with the image. If it can not be authenticated, recording is inhibited. Also, copying to analog form is prevented by appending an analog protection signal or CGMS-A data to the analog output of a DVD reproducing machine. If it is authenticated, a stream in which the token is deleted or disabled is recorded. Disabling (which is enough to create a mismatch with the result of arithmetic operation) is done for the token. Or, it is done by modifying the portion which is used for generating the token (if the token is generated from a modified image, it does not pass the verification because it is not a true token). When a further copying is attempted, recording is inhibited because an effective token does not exist.

A content having a token associated therewith must not be a copy. If this is detected in a stream from a writable DVD, it is deemed to be illegally copied and play-back is inhibited.

A system of generating a token using an asymmetrical key from an abstract made of a compressed image is shown in FIG. 6 as another embodiment of a copying control system in digital image distribution. The basic mechanism is same as the case where the one-way hash function is used. An important point in the case where a token is generated using an asymmetrical key lies in that the method of generating a token from an abstract is kept in secret while generation of an abstract from a token is open to public. In the user side, an abstract is prepared from a distributed token using a publicly open key and compared with an abstract similarly prepared from a distributed image to verify the match. Copying is inhibited when a token is valid despite the CF does not permit one time copying. Further, the token is disabled.

Without being limited to a data control, a system permitting to exercise a right only once may be similarly implemented by granting a certain right by appending a token and disabling the token when the right is exercised. For example, one can implement a method in which a token is attached to an electronic money and is disabled when the money is paid.

A method of controlling copying with a simple structure within an STB is next described as an application of this invention. As a method of receiving a toll digital broadcasting like a satellite broadcasting and controlling analog image recording based on toll information, Macrovision has existed. However, there has been no method of a handy control within an STB for recording a digital signal output in a digital recorder such as a DVD-RAM as it is. A conventional method of controlling an analog image recording using Macrovision is now described hereunder.

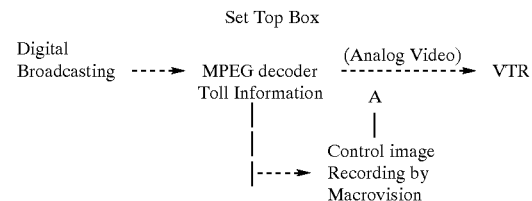

In order to allow a copy permission of a digital output to be simply granted within an STB only when a subscriber pays a toll, etc., in a toll digital broadcasting such as a satellite broadcasting, a control flag and a token are looked at. The reason of this is as follows.

With the control flag embedded by watermarking being Copy Control Information (CCI) of 2 bits, permission or prohibition of image recording/play back in a digital recorder such as a DVD-RAM is controlled by detecting a token (TOKEN) included in the User Data Area of MPEG-2 as described hereunder.

Digital Recorder like a DVD-Ram

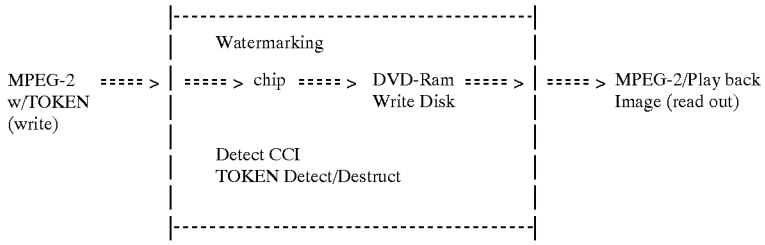

Copying control for writing and reading by a combination of the CCI and the token is as follows.

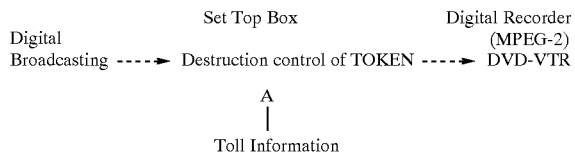

It will be seen from the above that copying permission can be done within an STB by looking at the CCI(1,0)+TOKEN.

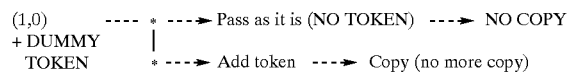

By having the sending side send out a MPEG-2 stream with CCI(1,0) and a token associated beforehand thereto and having the receiving STB control destruction of the token or passage of the token as it is based on the toll information which is input information from the exterior, for example, in a digital broadcasting, recording in an equipment having a watermark detecting chip, such as a digital recorder like a DVD-RAM is controlled as follows.

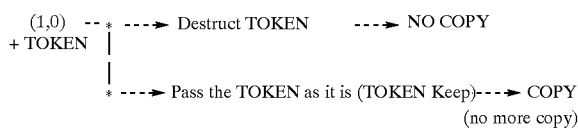

In addition, a method of embedding an invalid token in a portion corresponding to the token instead of putting a token beforehand in the sending side and calculating a right token in the STB is described hereunder.

```
(1,0)       ---- * ---> Pass as it is (NO TOKEN)  ---> NO COPY
+ DUMMY          |
  TOKEN          * ---> Add token  ---> Copy (no more copy)
```

A method of destructing a TOKEN and a method of adding a TOKEN are now specifically described hereunder.

In the method of destructing a TOKEN, the stream of MPEG is monitored to find a TOKEN Header as shown below. If the TOKEN Header is found, a control is effected as to whether to destruct the TOKEN following the TOKEN Header or not by taking the toll information into consideration. A TOKEN Header detecting circuit as well as an AND circuit for destructing a TOKEN can be easily implemented.

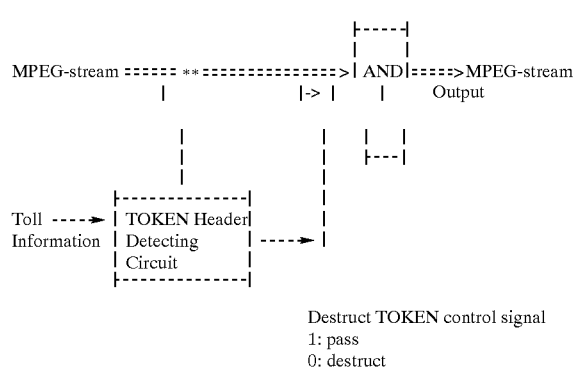

Destruct TOKEN control signal
1: pass
0: destruct

In the method of adding a TOKEN, the stream of MPEG is monitored and the TOKEN is calculated from the stream to find the TOKEN Header. If the TOKEN Header is found, the TOKEN is overwritten in the TOKEN area (containing dummy data) following the TOKEN Header by taking the toll information into consideration. A TOKEN Header detecting circuit, a TOKEN calculating circuit and a SELector circuit for adding a TOKEN can be easily implemented.

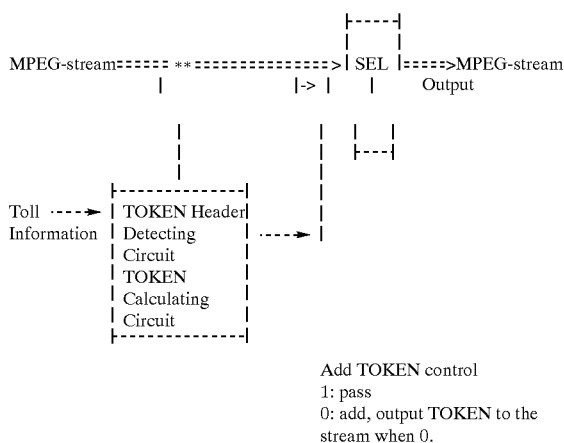

Add TOKEN control
1: pass
0: add, output TOKEN to the stream when 0.

As shown in the above embodiments, added information (TOKEN) for controlling copying (copy permitted or not) of a digital image output using a watermarking can be easily modified within the STB based on a smart card in a consumer box of an STB, etc., of a digital broadcasting, user toll information and user input information. It is important here that there is no need to obtain Copy Control Information (CCI) within the STB.

EFFECT OF THE INVENTION

By using the method of this invention, an effect which is equal to or mere than a conventional system in which an electronic watermarking technique is used for the entire data control is obtained with the number of logic gates which is 1/20 of the conventional system in an application of permitting one time copy of a distributed content because only a function for disabling a token is required beside electronic watermarking chips which are inherently required for detecting the CF.

In addition, when a token is embedded using only the electronic watermarking technique, it can be embedded only in the I frame so that the embedded "copy done" mark is ineffective if it departs from the MPEG format. On the other hand, while the token similarly becomes ineffective when it departs from the MPEG format, the effect of prohibiting copying survives any change of the data format because copying can not be done if the token becomes ineffective, thereby providing a more secure data control.

Further, added information (TOKEN) for controlling copying of a digital image output using a watermarking can be easily modified within the STB based on a smart card in a consumer box of an STB, etc., of a digital broadcasting, user toll information and user input information without the need to obtain Copy Control Information (CCI) within the STB.

Figure 1:
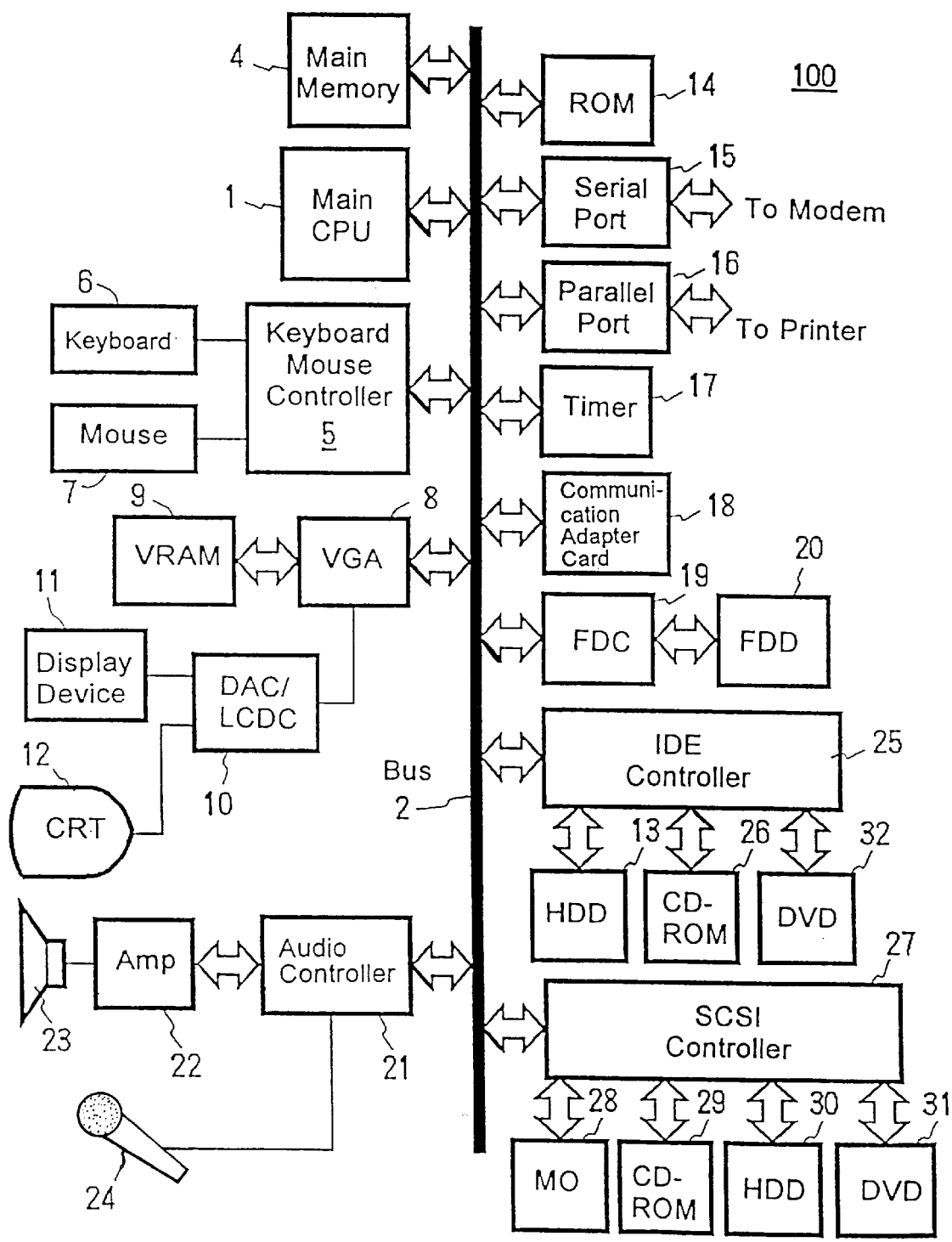
FIG. 1 shows an embodiment of a hardware configuration of a data control system.
Figure 2:
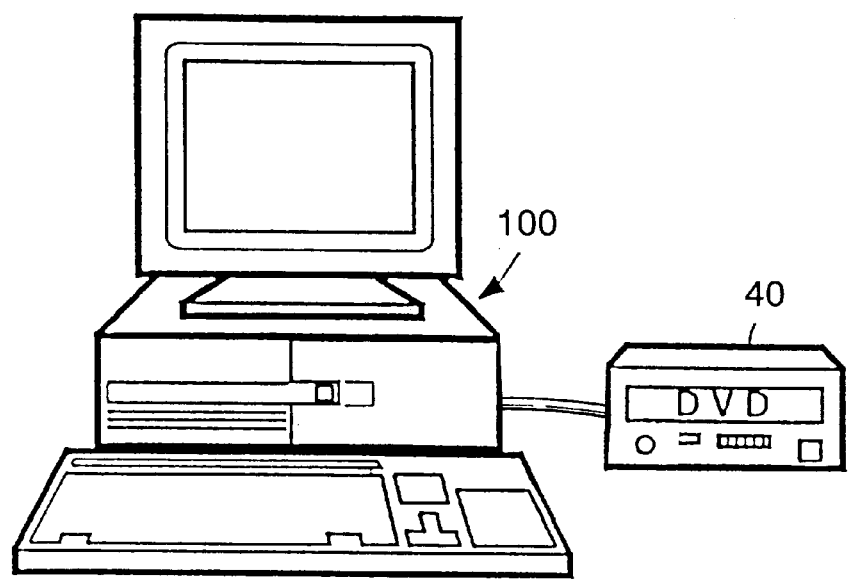
FIG. 2 is a schematic diagram of a data control system which uses an externally attached DVD drive.
Figure 3:
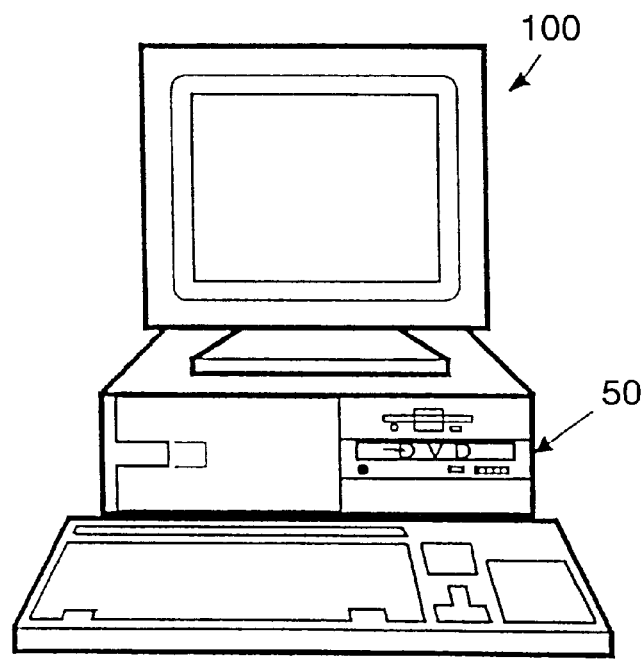
FIG. 3 is a schematic diagram of a data control system which has a DVD drive installed internally.
Figure 4:
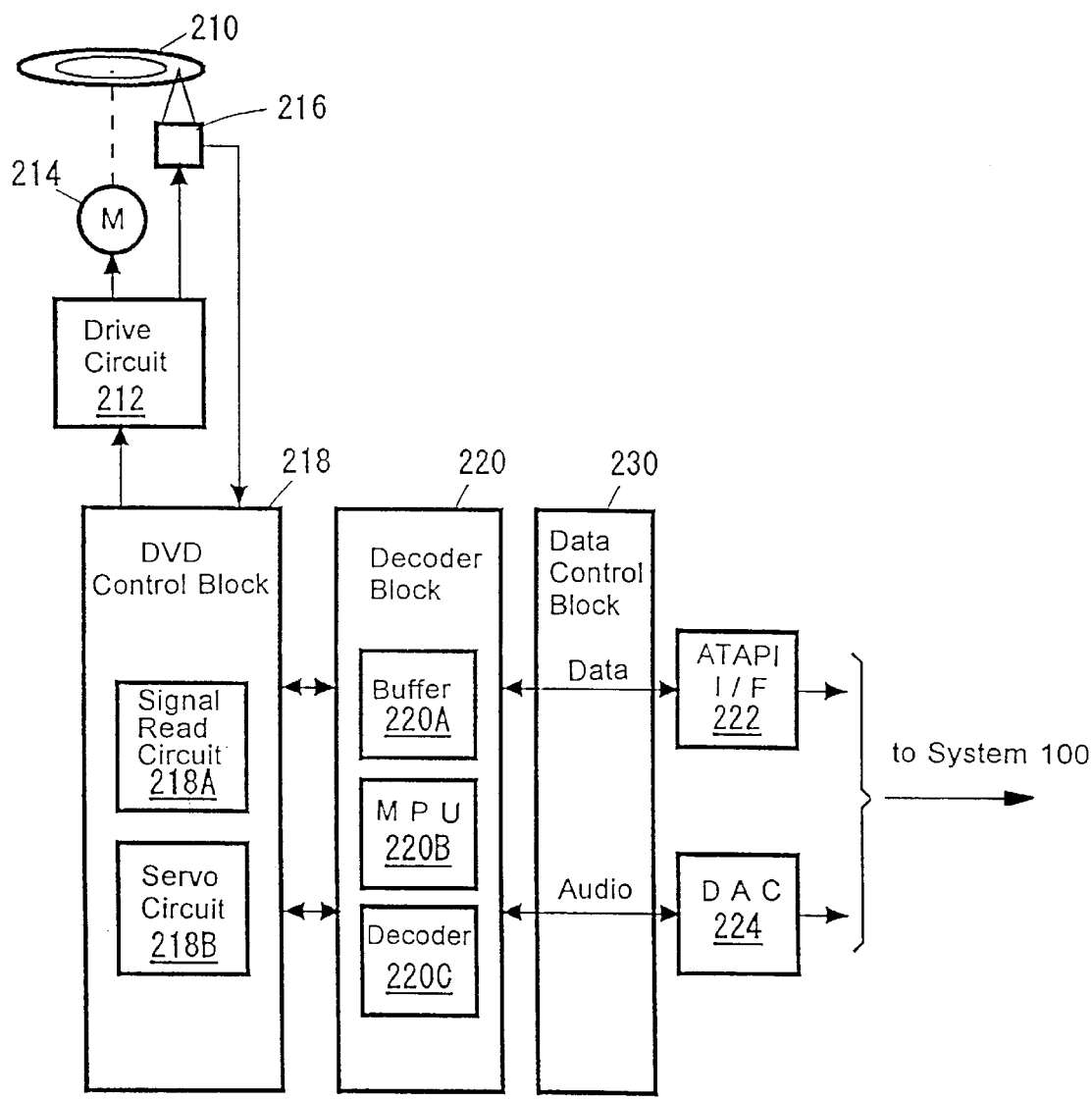
FIG. 4 is a block diagram of a DVD-R data control system.
Figure 5:
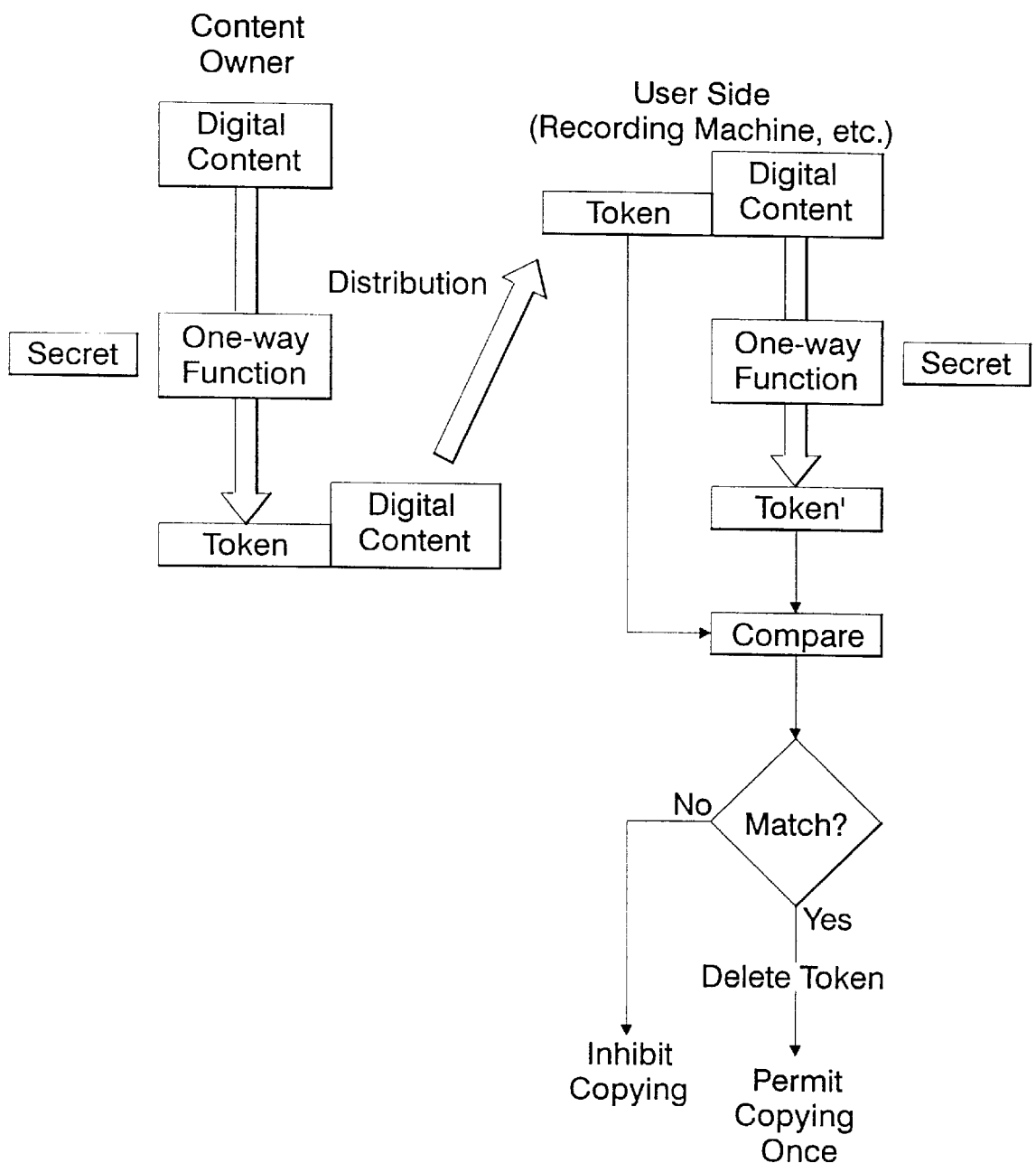
FIG. 5 shows a copying control system in digital image distribution which utilizes a one-way hash function.
Figure 6:
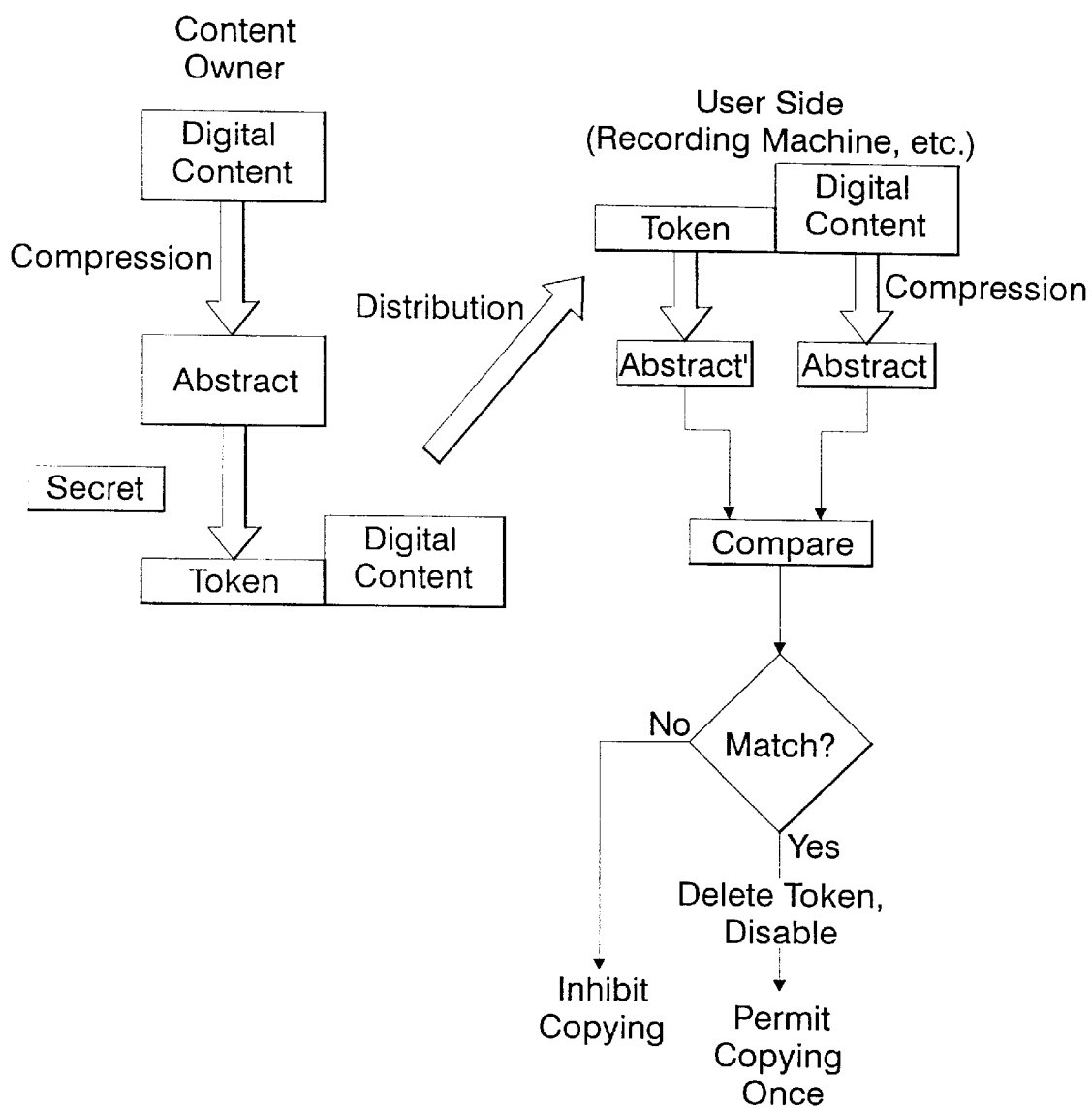
FIG. 6 shows a copying control system in digital image distribution which utilizes an asymmetrical key.
Figure 7:
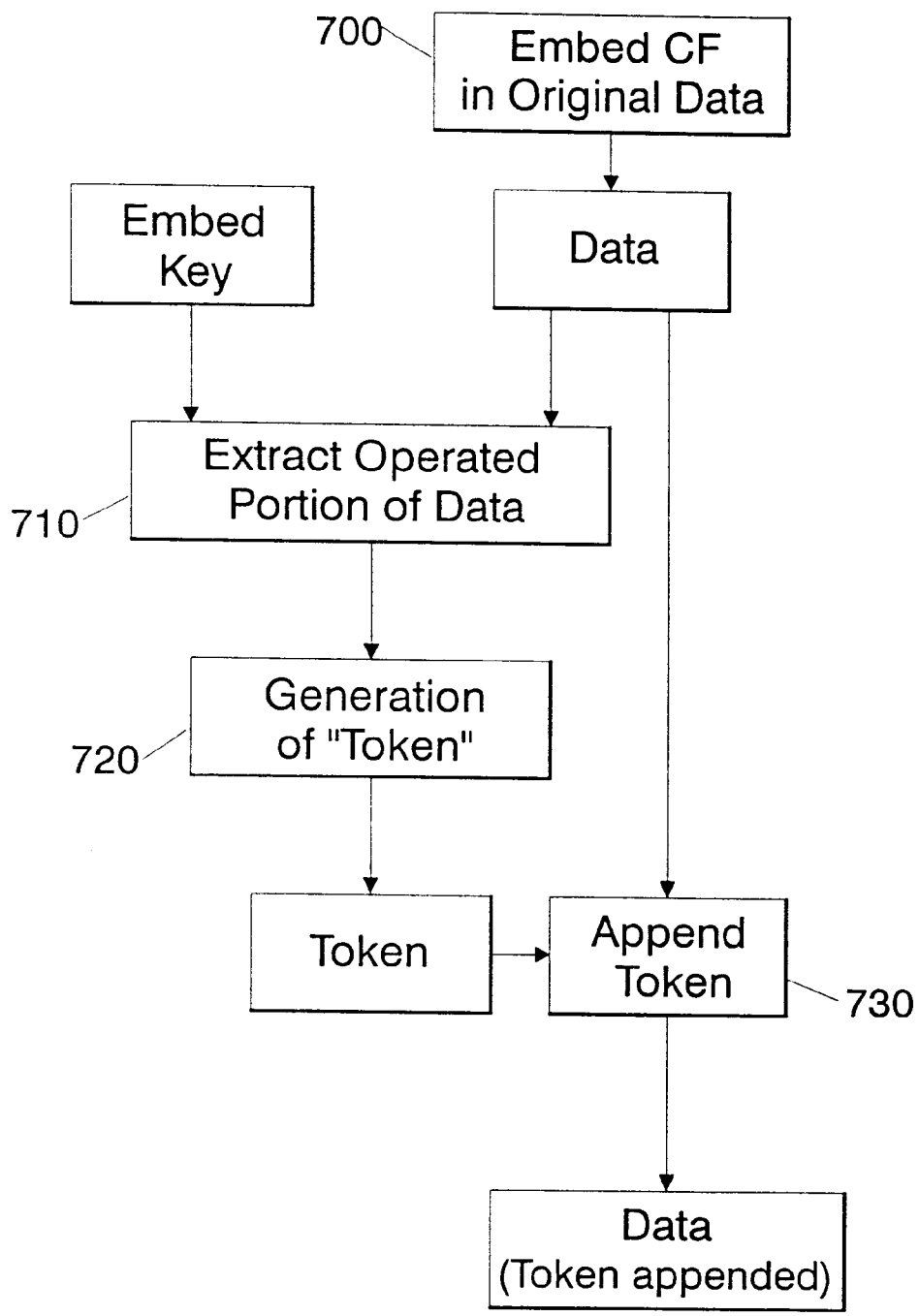
FIG. 7 is a diagram showing the flow of a token generating process.
Figure 8:
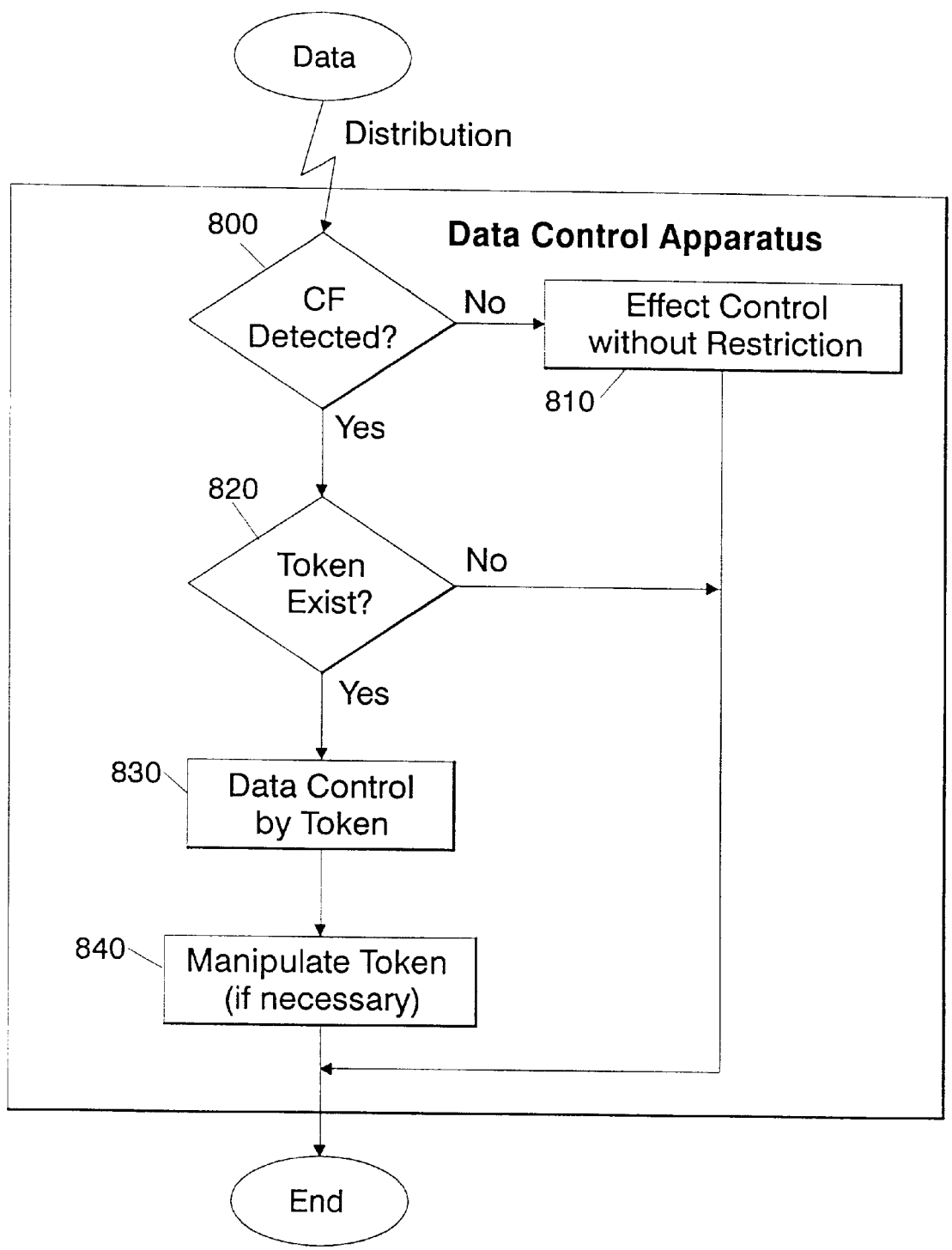
FIG. 8 is a diagram showing the flow of a data control process.

What is claimed is:

1. A data control system comprising;
    means for embedding a control flag indicating to effect data control in distributed data using an electronic watermarking technique,
    means for preparing a token having information as to how to control the data by using the content of said data,
    means for appending said token to said data,
    means for distributing said data to which said token is appended,
    means for detecting said control flag from the distributed data,
    means for reading said token appended to said data when said control flag is detected, and
    means for controlling said data according to a predefined control rule of said token or said control flag.

2. A data control system of claim 1 in which said means for controlling further comprises means for modifying, disabling or deleting said token.

3. A data control system of claim 2 in which said control is a control of copying, play-back or receiving.

4. A data copying apparatus comprising;
    means for detecting from data a control flag indicating to effect copying control of the data which is embedded using an electronic watermarking technique,
    means for reading out said token indicating copying control information of the data from said data when said control flag is detected, and
    means for effecting copying control of said data according to a predefined control rule of said token or said control flag.

5. A data play-back apparatus comprising;
    means for detecting from data a control flag indicating to effect play-back control of the data which is embedded in the data using an electronic watermarking technique,
    means for reading said token indicating play-back control information of the data from said data when said control flag is detected, and
    means for effecting play-back control of said data according to a predefined control rule of said token or said control flag.

6. A data receiving apparatus comprising;
    means for detecting from data a control flag indicating receiving control information of the data which is embedded using an electronic watermarking technique,
    means for reading said token indicating receiving control information of the data from said data when said control flag is detected, and
    means for effecting receiving control of said data according to a predefined control rule of said token or said control flag.

7. A data control apparatus comprising;
    means for detecting from data a control flag indicating to effect control of the data which is embedded in the data using an electronic watermarking technique,
    means for reading said token indicating how to control the data from said data when said control flag is detected, and means for effecting control of said data according to a predefined control rule of said token or said control flag.

8. A token preparation apparatus preparing a token for effecting data control comprising;
means for embedding in the data a control flag indicating to effect control of the data using an electronic watermarking technique,
means for preparing a token having information as to how to control the data using the content of said data, and
means for appending said token to said data.

9. A data control system comprising;
means for embedding in distributed data a control flag indicating to effect control of the data using an electronic watermarking technique,
means for preparing a token having information as to how to control the data using the content of said data,
means for appending said token to said data,
means for distributing said data to which said token is appended,
means for detecting said control flag from the distributed data,
means for reading out said token appended to said data,
means for preparing a token again from said data,
means for comparing the token read out with the token prepared again, and
means for effecting control of said data according to a predefined control rule of said token read out or said control flag using the result of said comparison.

10. A data control system of claim 9 in which said means for effecting control of data further comprises means for deleting or disabling said appended token.

11. A data control system of claim 10 in which said means for preparing a token and said means for preparing a token again further comprises means for preparing a token from the data using a one-way function.

12. A data control system of claims in which said control is a control of copying, play-back or receiving.

13. A data copying apparatus comprising;
means for detecting from data a control flag indicating to effect copying control of the data which is embedded in said data using an electronic watermarking technique,
means for reading out said token indicating copying control information of the data from said data when said control flag is detected,
means for preparing a token from said data,
means for comparing the token read out with the token prepared, and
means for effecting control of said data relating to copying according to a predefined control rule of said token read out or said control flag when said comparison matches.

14. A data play-back apparatus comprising;
means for detecting from data a control flag indicating to effect play-back control of the data which is embedded in said data using an electronic watermarking technique,
means for reading out said token indicating play-back control information of the data from said data when said control flag is detected,
means for preparing a token from said data,
means for comparing the token read out with the token prepared, and
means for effecting control of said data relating to play-back according to a predefined control rule of said token read out or said control flag using the result of said comparison.

15. A data receiving apparatus comprising;
means for detecting from data a control flag indicating to effect receiving control of the data which is embedded in said data using an electronic watermarking technique,
means for reading out said token indicating receiving control information of the data from said data when said control flag is detected,
means for preparing a token from said data,
means for comparing the token read out with the token prepared, and
means for effecting control of said data relating to receiving according to a predefined control rule of said token read out or said control flag when said comparison matches.

16. A data control apparatus for controlling data comprising;
means for detecting from data a control flag indicating to effect control of the data which is embedded in said data using an electronic watermarking technique,
means for reading out said token indicating how to control the data from said data when said control flag is detected,
means for preparing a token from said data,
means for comparing the token read out with the token prepared, and
means for effecting control of said data according to a predefined control rule of said token read out or said control flag when said comparison matches.

17. A data control system of claim 13 in which said means for effecting control of data further comprises means for deleting or disabling said appended token.

18. A token preparation apparatus preparing a token for effecting data control comprising;
means for embedding in the data a control flag indicating to effect control of the data using an electronic watermarking technique,
means for preparing a token having information as to how to control the data using the content of said data, and
means for appending said token to said data.

19. A data control system of claim 13 in which said means for preparing a token further comprises means for preparing a token from the data using a one-way function.

20. A data control method comprising;
a step of embedding a control flag indicating to effect data control in distributed data using an electronic watermarking technique,
a step of preparing a token having information as to how to control the data by using the content of said data,
a step of appending said token to said data,
a step of distributing said data to which said token is appended,
a step of detecting said control flag from the distributed data,
a step of reading out said token appended to said data when said control flag is detected, and
a step of controlling said data according to a predefined control rule of said token or said control flag.

21. A data control method of claim 20 in which said step of controlling said data further comprises a step of modifying, disabling or deleting said token.

22. A data control method of claim 21 in which said control is a control of copying, play-back or receiving.

23. A medium containing a program for effecting control of data, said program comprising;
- a function for detecting from data a control flag indicating to effect control of the data which is embedded in said data using an electronic watermarking technique,
- a function for reading out said token indicating how to effect control of the data from said data when said control flag is detected, and
- a function for effecting control of said data according to a predefined control rule of said token or said control flag.

24. A medium containing a program containing a program for preparing a token for data control, said program comprising;
- a function for embedding a control flag indicating to effect data control in the data using an electronic watermarking technique,
- a function for preparing a token having information as to how to control the data by using the content of said data, and
- a function for appending said token to said data.

25. A token preparation apparatus for effecting copying control of digital content comprising;
- means for embedding a control flag indicating to permit copying of the digital content in the digital content using an electronic watermarking technique,
- means for preparing a token having information to effect copying control of said digital content from said digital content by using a one-way function, and
- means for appending said token to said data.

26. A copying apparatus for a digital content comprising;
- means for detecting from a digital content a control flag indicating a permission to copy the digital content which is embedded in said digital content using an electronic watermarking technique,
- means for reading out said token appended to said digital content when said control flag is detected,
- means for preparing a token from said digital content using a one-way function,
- means for comparing the token read out with the token prepared, and
- means for copying said digital content when said comparison matches, and
- means for deleting said appended token from said digital content or modifying said digital content so that another comparison of the tokens fails.

27. A data control apparatus comprising;
- means for detecting from data a control flag embedded in said data by watermarking, said flag indicating that a control of data is to be effected,
- means for reading out from said data a token indicating control information of data when said control flag is detected, and
- means for controlling said data according to a predefined control rule of said token or said control flag based on input information from the exterior.

28. A data control apparatus comprising;
- means for receiving a control flag and a token embedded in said data by watermarking, said flag indicating that a control of data is to be effected and said token indicating control information of data, and
- means for controlling said data according to a predefined control rule of said token or said control flag based on input information from the exterior.

29. A data control apparatus of claim 27 in which said control is a copying control, a play back control or a receiving control.

30. A data control apparatus of claim 27 in which said means for controlling said data includes means for destructing said token or means for invalidating said token.

31. A data control apparatus of claim 27 in which said input from the exterior is toll information or user input information.

32. A data control system of claim 14 in which said means for effecting control of data further comprises means for deleting or disabling said appended token.

33. A data control system of claim 14 in which said means for preparing a token further comprises means for preparing a token from the data using a one-way function.

34. A data control system of claim 15 in which said means for effecting control of data further comprises means for deleting or disabling said appended token.

35. A data control system of claim 15 in which said means for preparing a token further comprises means for preparing a token from the data using a one-way function.

36. A data control system of claim 16 in which said means for effecting control of data further comprises means for deleting or disabling said appended token.

37. A data control system of claim 16 in which said means for preparing a token further comprises means for preparing a token from the data using a one-way function.

38. A data control system of claim 17 in which said means for preparing a token further comprises means for preparing a token from the data using a one-way function.

39. A data control system of claim 18 in which said means for preparing a token further comprises means for preparing a token from the data using a one-way function.

40. A data control apparatus of claim 28 in which said control is a copying control, a play back control or a receiving control.

41. A data control apparatus of claim 28 in which said means for controlling said data includes means for destructing said token or means for invalidating said token.

42. A data control apparatus of claim 28 in which said input from the exterior is toll information or user input information.

\* \* \* \* \*